Jan. 17, 1956 J. E. GALLO 2,730,815

SIMULATED RADIO RANGE TUNING CONTROL

Filed July 17, 1951

INVENTOR
JOSEPH E. GALLO
BY Orin R. Severn
his ATTORNEY

United States Patent Office 2,730,815

Patented Jan. 17, 1956

2,730,815

SIMULATED RADIO RANGE TUNING CONTROL

Joseph E. Gallo, Livingston, N. J., assignor to Curtiss-Wright Corporation, a corporation of Delaware Application July 17, 1951, Serial No. 237,212

8 Claims. (Cl. 35—10.2)

Figures 1, 2, 3:
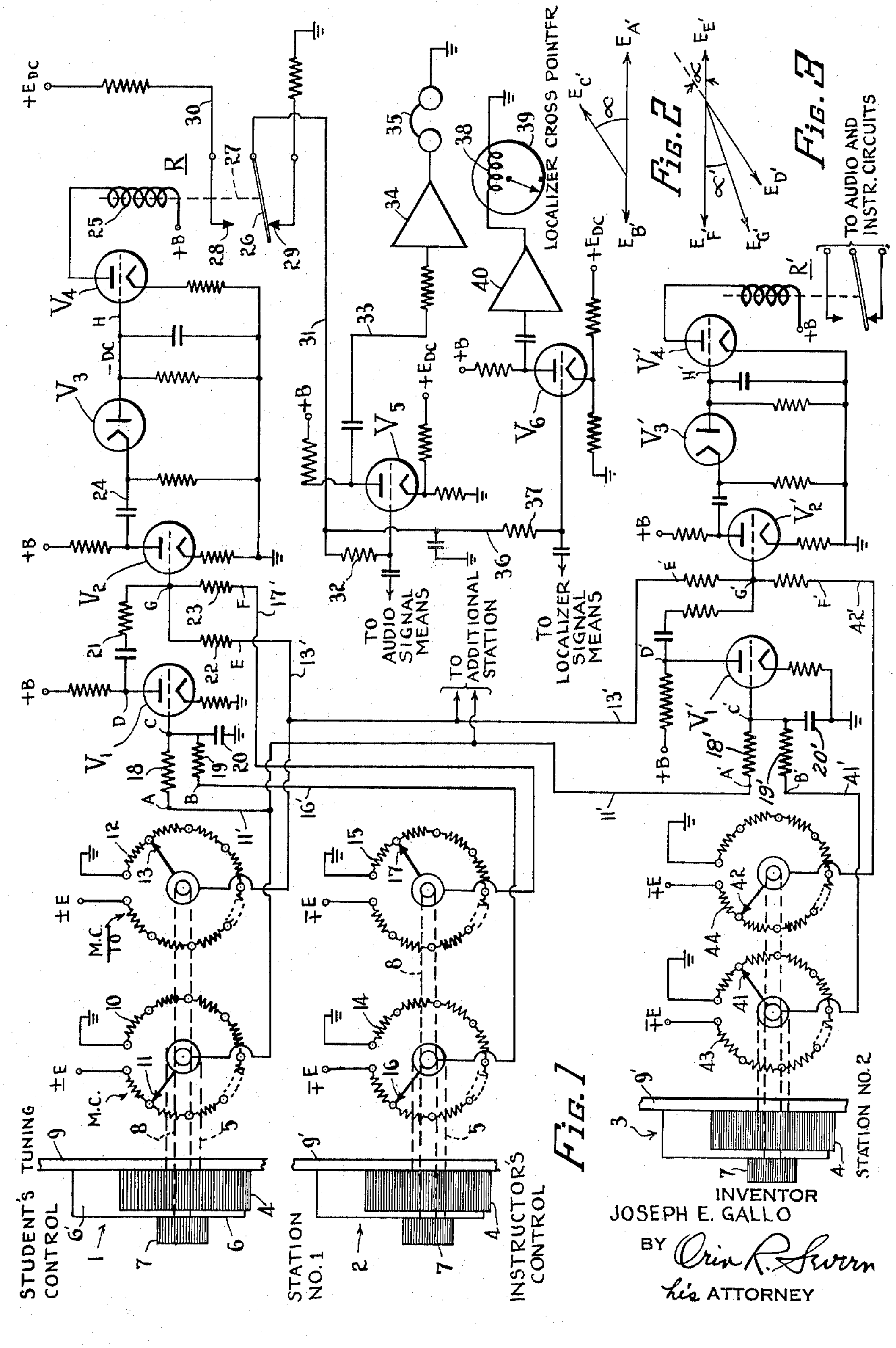

This invention relates to means for simulating the transmission and reception of radio range signals, particularly the frequency tuning control of radio range high frequency signal apparatus, and is useful in the ground training of aircraft personnel for radio navigation.

In actual flight the pilot when navigating by radio operates the tuning dial of his receiver set so as to "tune in" the particular station by which he desires to navigate. This tuning must be done carefully and accurately in order that the pilot may receive clearly the conventional radio range signals of the proper station, and also that he may obtain direction information from his radio instruments, such as the localizer cross pointer and automatic direction finder (A. D. F.) or radio compass. The pilot's ground training in this phase of radio navigation is therefore important since in actual flight he is often under stress in performing his duties, as when unfavorable flight conditions exist and when many other things require close attention. For example, due to the present crowded radio spectrum, it is easily possible, especially during darkness when signals are more numerous, that a pilot may tune in the wrong station and then concentrate on the A and N beam signals to such an extent that the station identification signals are not accurately noted.

A principal object of the present invention therefore is to provide in a radio navigation training system improved means for simulating radio station tuning that is realistic in respect to aural and visual indications and that requires the same degree of care as in tuning actual radio equipment for the purpose of inculcating in the student pilot careful radio tuning habits.

This invention will be more fully set forth in the following description referring to the accompanying drawing, and the features of novelty which characterize the invention will be pointed out with particularity in the claims annexed to and forming a part of this specification.

Referring to the drawing,

Fig. 1 is a partly diagrammatic and schematic illustration of an electrical system embodying the present invention for simultating high frequency radio station tuning of the character used in aircraft; and Figs. 2 and 3 are vector diagrams illustrating phase relationships of control voltages where off-tuning is simulated in the system of Fig. 1.

Apparatus of this general character is disclosed in my co-pending application, Serial No. 105,132, filed July 16, 1949, for "Flight Training Apparatus for Simulating Radio Station Tuning."

One form of very high frequency (V. H. F.) radio receiver used in aircraft includes a concentric tuning control on the control panel consisting of two switches. One switch is graduated in one megacycle steps between 108 and 135 megacycles, and the other is graduated in tenth megacycle steps from 0 to 0.9. Since the radio receiver itself is remotely located from the control panel, the actual tuning is done by motive apparatus subject to the aforesaid switch operation. This type of receiving apparatus may be specifically simultated in practicing the present invention.

Referring to Fig. 1, there are shown dial tuning controls 1, 2 and 3 representing respectively the student's tuning control at the aircraft control panel and two separate V. H. F. radio transmitting stations, station No. 1 and station No. 2. Both of the station controls 2 and 3 are individually adjustable by an instructor to represent various transmitting frequencies. The dial controls for all stations are similar and may be of the concentric type as in practice wherein an outer dial 4 representing megacycle (mc.) adjustment is provided with a tubular operating shaft 5 concentrically mounted in a casing 6 with respect to a small central dial 7 representing tenth mc. adjustments. This dial has an operating shaft 8 that extends centrally through the tubular shaft 5. The casing 6 (for the student's control) is mounted on the student's control panel 9 and is provided with an upper extension 6' having a window (not shown) on the front thereof for viewing dial positioned numerals that give the frequency in mc. and tenth mc. readings. The transmitter station dial controls 2 and 3 are located on a control panel 9' conveniently located at the instructor's station. Since the operation is essentially the same if one or a number of transmitter stations are selectively represented, the description will be mainly confined to the simulated tuning in of station No. 1 by the student.

The student's control comprises a potentiometer 10 having a slider contact 11 operable by the mc. dial shaft 5, and a potentiometer 12 having a slider 13 operable by the tenth mc. dial shaft 8. Both potentiometers are energized by an alternating current (A. C.) voltage having instant reference polarities as indicated and the derived A. C. voltages at the sliders 11 and 13 represent the dial settings in mc. and tenth mc. units respectively. The potentiometers may be provided with contact positions as indicated for simultating the switch positions of actual equipment.

The instructor's control at station No. 1 is similar except that the potentiometers 14 and 15 are both energized by an A. C. voltage that is opposite in phase to that energizing the student's potentiometers 10 and 12. Accordingly, the sliders 16 and 17 that are operated respectively by the dial shafts 5 and 8 take off voltages of opposite phase representing the transmitter frequency in mc. and tenth mc. The aforesaid derived voltages from both the student's and instructor's stations are all summed according to pairs, i. e., the pair of mc. voltages at the amplifier valve $V_1$ and the pair of tenth mc. voltages at the amplifier valve $V_2$. The circuits are so arranged that if the student is not tuned properly to the frequency setting of station No. 1 there will be produced in every case by valve $V_2$, regardless of the combinations of off-tuned settings of the student's dials, an A. C. control voltage that may be rectified by the rectifier $V_3$ for producing a negative D. C. voltage for in turn biasing to cut off a relay valve $V_4$ and deenergizing the relay R. If the student is tuned correctly to the station frequency there will be no output from valve $V_2$ with a result that the valve $V_4$ passes current to maintain the relay R energized. This relay when deenergized is used to affect the operation of or disable both the audio signal system and the visual or instrument signal system hereinafter described, and when energized permits normal operation of said systems.

Specifically, the derived voltages from the mc. potentiometers 10 and 14 at the contacts 11 and 16 are fed by conductors 11' and 16' respectively to the control grid of the summing amplifier valve $V_1$ through proportioning input resistors 18 and 19. The grid circuit is also connected at C to a dephasing circuit including a condenser 20 as illustrated for preventing ambiguity in tuning as hereinafter described. This dephasing circuit causes the resultant voltage at point C to be dephased with respect to the individual mc. voltages at points A and B, respectively. If the mc. dial settings are similar, the derived voltages will be equal and opposite in phase and there will be no resultant voltage at point C. If, however, the settings are not similar (representing off tuning), there will be a resultant A. C. voltage at point C that is dephased as above described. This voltage is amplified by the valve $V_1$ and the output at D (which is dephased 180° with respect to the grid voltage) is fed through an isolating circuit 21 to the grid of the second summing amplifier valve $V_2$ at point G. This grid is connected by conductors 13′ and 17′ having input resistors 22 and 23 to the tenth mc. potentiometer sliders 13 and 17 so that the grid has also impressed thereon the tenth mc. voltages. The plate circuits of the valves are energized in conventional manner by a D. C. voltage designated +B.

The summing amplifier valve $V_2$ constitutes in effect a second amplifier stage wherein the resultant A. C. voltage on the grid of $V_2$ is amplified and the output fed through an isolating circuit 24 to the rectifier $V_3$ and associated smoothing circuit, the output of which at point H is negative D. C. as indicated. The rectifier output is connected to the grid of relay valve $V_4$ which is adapted to be biased to cut off by the negative D. C. from the rectifier. Conversely, the valve $V_4$ normally passes current to energize the winding 25 of relay R when the rectifier output is zero.

The relay R includes a movable contact 26 connected as indicated to the relay coil at 27 for operation between the contacts 28 and 29. When the circuit including conductors 30 and 31 is made by contacts 26 and 28 in response to energization of the relay, a D. C. voltage $E_{dc}$ is impressed on the grid of valve $V_5$ through a resistance 32. The grid is also connected to a radio range signal system including a source of audio signal voltage and conventional coding apparatus such as that disclosed in Dehmel Patent 2,366,603, granted January 2, 1945, for "Aircraft Training Apparatus." The valve by reason of the auxiliary D. C. voltage impressed on the cathode circuit as indicated is biased to cutoff in the absence of the aforesaid voltage $E_{dc}$ on the grid circuit, and vice versa. The output of the valve $V_5$ is connected through the amplifier input circuit 33 and amplifier 34 to the student's headphones 35 so that the student receives aural signals from the radio range system when the valve $V_5$ is operable, and vice versa.

Similarly, the relay R may control visual signal means such as the localizer cross pointer. The aforesaid voltage $E_{dc}$ may also be connected by the relay through conductors 31 and 36 and input resistor 37 to the grid circuit of valve $V_6$ which is also connected to a suitable source of localizer signal voltage as indicated. A localizer signal may be produced in any suitable way to represent deviation of the instant flight position with respect to a predetermined approach path to the radio station, such as indicated in Dehmel Patent 2,529,468, granted November 7, 1950, for "Radio Range Navigation Apparatus for Training Aircraft Personnel." As in the case of valve $V_5$ the cathode circuit of valve $V_6$ includes an auxiliary D. C. voltage so that the valve is biased to cut off when the voltage $E_{dc}$ is disconnected by the relay R from the grid. Conversely, energization of the relay causes the valve $V_6$ to conduct so as to energize the coil 38 of the cross pointer instrument 39 through the valve output circuit including amplifier 40.

The operation of the system will now be apparent from the above description and may be summarized briefly as follows: As will be seen from a comparison of the settings of the student's and instructor's control potentiometers, the student is represented as properly tuned in to station No. 1. In this case the mc. voltages from potentiometers 10 and 14 cancel each other (since they are equal in magnitude and opposite in phase) at the grid (point C) of the valve $V_1$ so there is no voltage output at point D in the plate circuit. Also the tenth mc. voltages from potentiometers 12 and 15 cancel each other at the grid (point G) of the valve $V_2$ so that this valve is also cut off. It will therefore be seen that the circuitry including the summing valves $V_1$ and $V_2$, etc., functions as resolving means for the various input voltages, the resolved output in the present instance being zero. Accordingly, the output of the rectifier $V_3$ is zero, the relay valve $V_4$ passes current for maintaining energized the relay R, and the contacts 26 and 28 are closed. This impresses a positive D. C. voltage on the grids of the audio and localizer signal valves $V_5$ and $V_6$ and permits normal operation of both the audio and visual signal systems.

Conversely, assuming error in tuning at the tenth mc. dial for example, it will be apparent that the uncancelled tenth mc. voltage at point G causes the valve $V_2$ to conduct with the result that the relay valve $V_4$ is biased to cut off by the rectified negative voltage and the relay R is de-energized, thereby grounding the grid circuits of the valves $V_5$ and $V_6$ and disabling the audio and visual signal systems to simulate off-tuning.

When another station, as station No. 2, is to be represented, the dial control 3 is adjusted by the instructor so as to set the sliders 41 and 42 of the mc. and tenth mc. potentiometers 43 and 44 to correspond with the selected station frequency. As in the case of station No. 1, the derived voltages from the mc. potentiometers 10 and 43, and the derived voltages from the tenth mc. potentiometers 12 and 44 are summed as indicated at the valves $V'_1$ and $V'_2$. The resultant voltage is fed to rectifier $V'_3$ which controls the relay valve $V'_4$ and relay R′ in the manner and for the purpose above described.

Assuming now a possible case of off-tuning as illustrated with respect to station No. 2 where the station mc. voltage $E_{B'}$ at the point B′ is equal to the student's tenth mc. voltage $E_{E'}$ at the point E′, and the student's mc. voltage $E_{A'}$ is equal to the station tenth mc. voltage $E_{F'}$; it will be apparent upon inspection of Figs. 2 and 3 that the resultant tenth mc. voltage at the grid junction G′ would cancel the resultant mc. output voltage of valve $V'_1$ at D′ since it would be equal in magnitude and opposite in phase to said mc. voltage, were not the resultant mc. voltage $E_{C'}$ at the grid of valve $V'_1$ shifted in phase as by the angle $\alpha$, Fig. 2. That is, the resultant of the oppositely phased voltages $E_{A'}$ and $E_{B'}$, Fig. 2, appearing at the grid circuit (point C′) of valve $V'_1$ is now dephased by angle $\alpha$ in well-known manner by the above described dephasing circuitry which includes the resistances 18′ and 19′ and the condenser 20′. This resultant voltage may be represented by the vector $E_C'$, Fig. 2. The output of valve $V'_1$ which is 180° out of phase with the grid voltage C′ may be represented by the vector $E_{D'}$, Fig. 3. Therefore, the resultant of all the voltages impressed on the grid of the valve $V'_2$ may be represented by the vector $E_{G'}$ which has a new phase shift angle $\alpha'$ and so is not subject to cancellation by the vector $E_{C'}$. Accordingly, ambiguity in tuning is prevented since there will be a resultant off-tuning voltage impressed on the grid of valve $V'_2$ and the rectified output will cut off the valve $V'_4$ to deenergize the relay R′, thereby disabling the audio and visual signal systems to simulate off-tuning. As used in the present specification, the term "ambiguity in tuning" is intended to mean an indicated tuned condition at the signal receiver for more than one combination of settings of the student's dials for a given station frequency as determined by the instructor.

Additional stations may be represented as indicated, by using the student mc. and tenth mc. voltages on the conductors 11′ and 13′ in a summing rectifying circuit duplicating that of station No. 2. Appropriate switching means (not shown) can be used in an obvious manner for selectively switching the student's receiving station to any one of various simulated transmitting stations.

It should be understood that this invention is not limited to specific details of construction and arrangement thereof herein illustrated, and that changes and modifications may occur to one skilled in the art without departing from the spirit of the invention.

I claim:

1. In a training system for radio navigation having means for simulating radio range signal transmitting and receiving apparatus, means for simulating radio station tuning by a navigator comprising a pair of variable electrical means representing the transmitter and adjustable in units and fractions thereof respectively of the transmitter frequency by an instructor for representing a given range of station frequencies, a second pair of variable electrical means representing the receiver controls and independently adjustable in units and fractions thereof of said frequency by a student for representing the same range of station frequencies whereby corresponding settings of the respective variable means represents a receiver tuned to a given station frequency, electrical resolving means connected to said radio range receiving apparatus and responsive jointly to all four of said variable electrical means for affecting the operation of said radio range receiving apparatus, according to a simulated tuned or off-tuned condition and means related to said resolving means for limiting the simulation of a tuned condition to but one combination of settings of the student's pair of variable means for a given station frequency.

2. In a training system for radio navigation having means for simulating radio range signal transmitting and receiving apparatus, means for simulating radio station tuning by a navigator comprising a pair of variable electrical means representing the transmitter and adjustable in megacycle and tenth megacycle steps respectively by an instructor for representing a given range of station frequencies, a second pair of variable electrical means representing the receiver controls and independently adjustable in megacycle and tenth megacycle steps respectively by a student for representing the same range of station frequencies, resolving means responsive to all four of said variable electrical means for producing an electrical control quantity according to an off-tuned difference in said adjustments, said resolving means being adapted to produce a control quantity for any combination of off-tuned settings of the student's pair of variable electrical means for a given station frequency, and electrical means responsive to said control quantity for controlling said signal receiving apparatus for representing an off-tuned condition.

3. In a training system for radio navigation having means for simulating radio range signal transmitting and receiving apparatus, means for simulating radio station tuning by a navigator comprising a pair of variable A. C. voltage deriving means representing the transmitter and adjustable in megacycle and tenth megacycle steps respectively by an instructor for representing a given range of station frequencies, a second pair of variable A. C. voltage deriving means representing the receiver controls and independently adjustable in megacycle and tenth megacycle steps respectively by a student for representing the same range of station frequencies whereby corresponding settings of the aforesaid variable voltage deriving means represents a receiver tuned to a given frequency, and electrical resolving means jointly responsive to voltages from all four variable voltage deriving means for controlling said signal receiving apparatus according to a simulated tuned or off-tuned condition, said resolving means also being operative according to the phase relationship between the pair of megacycle voltages and the pair of tenth megacycle voltages so that said signal receiving apparatus represents a tuned condition for but one combination of settings of the pair of said student voltage deriving means for a given station frequency.

4. In a training system for radio navigation having means for simulation of radio range signal transmitting and receiving apparatus, means for simulating radio station tuning by a navigator comprising a pair of alternating current means representing the transmitter and adjustable in units and fractions thereof respectively, by an instructor, a second pair of alternating current means representing the receiver controls and independently adjustable in corresponding units and fractions thereof respectively by a student whereby corresponding settings in said units and fractions thereof of the aforesaid alternating current means represents a receiver tuned to a given station, and electrical means responsive jointly to alternating current voltages from all four of said alternating current means for controlling according to a simulated tuned or off-tuned condition, said signal receiving apparatus, said electrical means including dephasing means associated with a corresponding alternating current means of each pair for precluding the representation of a tuned condition for more than one combination of settings by the student.

5. In a training system for radio navigation having means for simulating radio transmitting and receiving apparatus for the reception of direction data from a reference radio station, means for simulating radio station tuning by a navigator comprising a pair of adjustable electrical means representing the radio transmitter and operable by an instructor for deriving a pair of reference A. C. voltages representing units and fractions thereof respectively of a given station frequency, a pair of adjustable electrical means representing the radio receiver controls and operable by a student for deriving a pair of A. C. voltages opposite in sense respectively to the corresponding reference voltages for representing said units and fractions thereof respectively, the corresponding unit voltages and the corresponding fraction voltages when equal in magnitude representing a tuned condition of the transmitter and receiver, electrical resolving means jointly responsive to all said derived voltages for producing in accordance with off-tuned settings of the student's deriving means a resultant electrical control quantity, and means responsive thereto for disabling said simulated receiving means to represent off-tuning, said resolving means being phase sensitive for limiting a simulated tuned condition of the receiver to but one combination of settings of said student deriving means for a given station frequency.

6. In a training system for radio navigation having means for simulating radio transmitting and receiving apparatus for the reception of aural signals and direction data from a reference radio station, means for simulating radio station tuning by a navigator comprising a pair of adjustable electrical means representing the radio transmitter and operable by an instructor for deriving a pair of reference A. C. voltages representing megacycles and tenth megacycles respectively of a given station frequency, a pair of adjustable electrical means representing the radio receiver controls and operable by a student for deriving a second pair of A. C. voltages, said derived megacycle and tenth megacycle voltages respectively when equal in magnitude representing a tuned condition of the transmitter and receiver, and electrical means including dephasing means for a corresponding A. C. voltage of each pair for precluding the representation of a tuned condition for more than one combination of settings by the student, said electrical means jointly responsive to all said derived voltages for producing for an off-tuned condition, a resultant control voltage, said simulated reception means being responsive to said control voltage for causing disabling of said reception means to simulate off-tuning.

7. In a training system for radio navigation having means for simulating radio transmitting and receiving apparatus for the reception of radio signals from a reference radio station, means for simulating radio station tuning by a navigator comprising a pair of potentiometer means representing the radio transmitter and adjustable respectively in megacycle and tenth megacycle steps by an instructor for deriving a pair of reference A. C. voltages representing megacycles and tenth megacycles of a given station frequency, a pair of potentiometer means representing the radio receiver controls and adjustable in megacycle and tenth megacycle steps respectively by a student for deriving a pair of A. C. voltages of opposite phase relation to the transmitter voltages, said megacycle and tenth megacycle derived voltages of different pairs respectively when equal in magnitude representing a tuned condition of the transmitter and receiver, resolving means including a first electrical summing means for an A. C. voltage of a first pair and the corresponding voltage of the other pair, a second electrical summing means for the other A. C. voltage of said first pair and the corresponding voltage of the other pair, and dephasing means for one pair of the input voltages at one of said summing means for precluding the representation of a tuned condition for more than one combination of settings by the student, said resolving means being responsive to all said derived voltages for producing for a simulated off-tuned condition a resultant control voltage and means responsive to said resultant voltage for controlling said simulated receiving means to represent off-tuning.

8. In a training system for radio navigation having means for simulating radio transmitting and receiving apparatus for the reception of aural signals and direction instrument signals from a reference radio station, means for simulating radio station tuning by a navigator comprising a pair of adjustable voltage deriving means representing the reference transmitting station and operable by an instructor for deriving a pair of reference alternating current voltages representing respectively units and fractions thereof in the station frequency, a second pair of adjustable voltage deriving means representing the radio receiver controls and operable by a student for deriving a second pair of alternating current voltages representing corresponding units and fractions thereof in said frequency, said unit and fraction voltages derived by the instructor and student being of opposite phases, means for dephasing one pair of said derived voltages for precluding the representation of a tuned condition for more than one combination of settings by the student, the corresponding derived unit and fraction voltages when equal in magnitude representing a tuned condition of the transmitter and receiver, a pair of electrical summing means responsive respectively to said pair of dephased voltages and to the other pair of voltages for jointly producing for an off-tuned condition a resultant control voltage that is dephased with respect to all said derived voltages, and means responsive to said control voltage for disabling said aural and direction signal receiving simulating means to simulate off-tuning.

References Cited in the file of this patent

UNITED STATES PATENTS

| | | |
|---|---|---|
| 2,321,799 | Cone Jr., et al. | June 15, 1943 |
| 2,457,832 | Poorman | Jan. 4, 1949 |
| 2,471,315 | Dehmel | May 24, 1949 |
| 2,559,039 | Decker | July 3, 1951 |
| 2,560,527 | Dehmel | July 10, 1951 |
| 2,631,778 | Piper et al. | Mar. 17, 1953 |